3,706,765
HYDROXYETHANO-ANTHRACENES
Max Wilhelm, Allschwil, Switzerland, assignor to Ciba-Geigy Corporation, Ardsley, N.Y.
No Drawing. Filed Dec. 16, 1969, Ser. No. 885,646
Claims priority, application Switzerland, Jan. 3, 1969, 13/69; Dec. 2, 1969, 17,952/69
Int. Cl. C07c 87/28; C07d 27/56, 5/12
U.S. Cl. 260—326.14 T                                  9 Claims

ABSTRACT OF THE DISCLOSURE 9,10-dihydro-9,10-ethano-anthracenes which in at least one of the positions 1 to 8 contain a free or acylated hydroxyl group and in 9-position an aminoalkyl radical and their salts are useful as psychotropic agents.

SUMMARY OF THE INVENTION

The present invention relates to new hydroxy-ethano-anthracenes. Especially it concerns 9,10 - dihydro - 9,10-ethano-anthracenes possessing the nucleus of formula

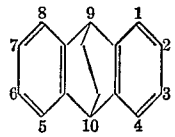

which in the 9-position possess an aminoalkyl radical and in at least one of the positions 1 to 8 possess a free or acylated hydroxyl group, and their salts, as well as pharmaceutical preparations containing the same.

In the aminoalkyl radical of the new compounds the alkylene radical linking the amino group to the ethano-anthracene nucleus is above all a lower straight or branched alkylene radical having at most 5 carbon atoms, especially a radical of this kind which separates the amino group from the nucleus by 1 to 3, especially 1 or 3, carbon atoms, such as the propylene-(1,3), propylene-(1,2), ethylene-(1,2) or methylene radical.

The amino group of the aminoalkyl radical in the 9-position may be unsubstituted or substituted. Herein a substituted amino group is for example a secondary or tertiary amino group, i.e. a monosubstituted or disubstituted amino group. As substituents, there should above all be mentioned lower aliphatic hydrocarbon radicals, which can also be substituted by hetero-atoms such as oxygen, sulfur or nitrogen atoms and/or substituted by hydroxyl groups, or lower araliphatic hydrocarbon radicals. Possible radicals of this kind are above all lower alkyl radicals, lower alkylene radicals, lower oxaalkylene, lower azaalkylene or lower thiaalkylene radicals, or phenyl-lower alkyl radicals. Lower alkyl radicals are for example methyl, ethyl, propyl, isopropyl, or straight or branched butyl, pentyl, hexyl or heptyl radicals bonded in any desired position. Lower alkylene radicals, oxaalkylene radicals, azaalkylene radicals and thiaalkylene radicals are above all those which together with the amino-nitrogen atom yield a 5–7 membered ring, such as for example butylene-(1,4), pentylene-(1,5), hexylene-(1,5), hexylene-(1,6), hexylene-(2,5), heptylene-(2,7), heptylene - (2,6), 3-oxapentylene - (1,5), 3-thiapentylene-(1,5), 2,4-dimethyl-3-thiapentylene-(1,5), 3-aza-pentylene-(1,5), 3-lower alkyl-3-aza-pentylene-(1,5), such as 3-methyl-3-aza-pentylene-(1,5), 3-hydroxy-lower alkyl-3-aza-pentylene-(1,5), such as 3-(β-hydroxy-ethyl)-3-aza-pentylene-(1,5), 3-oxahexylene-(1,6) or 3-aza-hexylene-(1,6) radicals. Phenyl-lower alkyl radicals are above all benzyl or 1- or 2-phenylethyl radicals which can also be substituted by lower alkyl radicals, for example those mentioned, lower alkoxy radicals, for example methoxy or ethoxy, halogen atoms, for example fluorine, chlorine or bromine atoms, or trifluoromethyl groups.

According to this the amino group is for example a benzylamino or N-lower alkylbenzylamino group, such as an N - methylbenzylamino or N - ethyl - benzylamino group, or a pyrrolidino or piperidino group which is optionally C-lower alkylated and/or β-singly unsaturated in the ring, or an optionally C-lower alkylated piperazino, N'-lower alkyl-piperazino or N'-(hydroxy-lower alkyl)-piperazino, thiomorpholino or morpholino group, or above all a mono-lower alkylamino or di-lower alkylamino group, such as a methylamino, ethylamino, dimethylamino, diethylamino or N-methyl-ethylamino group.

Acylated hydroxyl groups are above all those in which the acyl radical is the radical of a carboxylic acid, such as for example a lower alkanoyl radical, such as an acetyl, propionyl, pivalyl, butyryl or valeryl radical, or a benzoyl radical, which can also be substituted by lower alkyl radicals, for example those mentioned, lower alkoxy radicals, for example methoxy or ethoxy, halogen atoms, for example fluorine, chlorine or bromine atoms, or trifluoromethyl groups.

The new compounds may contain further substituents. Thus they may contain further substituents on the aromatic ring (positions 1–8), such as for example lower alkyl radicals, for example those mentioned, above all methyl radicals, halogen atoms, for example those mentioned, above all chlorine and/or trifluoromethyl groups. The new compounds can furthermore be substituted in the 10-position, for example by lower alkyl radicals, for example those mentioned, especially methyl radicals, or by halogen atoms, for example those mentioned, above all chlorine.

The new compounds possess valuable pharmacological properties, especially a central-inhibitory action. Thus, alongside a cocaine-antagonistic action, they in particular show an antagonism towards psychomotor substances such as for example mescaline, as is found in animal experiments, for example on orally administering doses of 10 to 100 mg./kg. to mice, and possess an inhibitory action on the spinal reflex transmission and a histaminolytic action. The new compounds are therefore useful as sedative and especially psychotropic such as antidepressive and tranquillizing agents. They possess a higher therapeutic index and a longer duration of action than the known ethano-anthracenes. They can also be used as additives to animal fodder, since they result in better nutient utilization and an increase in weight of these animals. The new compounds can further serve as starting substances or intermediate products for the manufacture of other valuable compounds.

Compounds to be particularly emphasized are those of formula

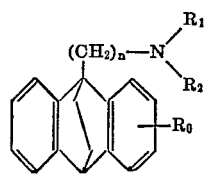

wherein $n$ represents 1 or 3, $R_1$ denotes a lower alkyl radical, especially the ethyl radical or above all the methyl radical, or a hydrogen atom, $R_2$ represents a lower alkyl radical, especially the ethyl radical and above all the methyl radical, and $R_0$ denotes a lower alkanoyloxy group, especially the acetoxy group, or above all a free hydroxyl group, preferably those compounds of the above formula wherein the radical $R_0$ is in the 2-position, especially 2 - hydroxy-9-(dimethylaminomethyl)-9,10-dihydro-9,10- ethano-anthracene and above all 2-hydroxy-9-(methylaminomethyl)-9,10-dihydro-9,10-ethano-anthracene which on oral administration to the mouse e.g. in the form of its hydrochloride shows a distinct morphinantagonistic action in a dose of 10 mg./kg. and a cocainantagonistic action in a dose of 10 to 30 mg./kg.

The new compounds are obtained according to methods which are in themselves known.

Thus, for example, the new compounds in which the amino group of the aminoalkyl radical is tertiary are obtained when in a 9,10-dihydro-9,10-ethano-anthracene which in the 9-position possesses a tert. aminoalkyl radical, and in at least one of positions 1 to 8 possesses a free amino group, the free amino group(s) is/are converted into a free hydroxyl group or groups.

The conversion of a free amino group into a hydroxyl group takes place in the usual manner by diazotization and boiling with water. The diazotization is performed in the usual manner, above all by treatment with nitrous acid or its salts, such as alkali salts, for example sodium nitrite, in the presence of acids such as mineral acids, for example hydrochloric acid or above all sulfuric acid.

Another process for the manufacture of the new compounds consists in eliminating in a 9,10-dihydro-9,10-ethano-anthracene which in the 9-position possesses an aminoalkyl radical and in at least one of positions 1 to 8 an α-aralkoxy radical, the α-aralkyl group by reduction.

The reduction is carried out with catalytically activated hydrogen, such as with hydrogen in the presence of a hydrogenating catalyst, for example a palladium or platinum catalyst.

The new compounds may also be obtained when a 9-oxoalkyl-9,10-dihydro-9,10-ethano-anthracene, which contains in at least one of the positions 1 to 8 a free or acylated hydroxyl group, is reacted with an amine containing at least one hydrogen atom at the nitrogen atom and in the condensation product so obtained the azomethine bond is reduced.

The reduction is carried out in the usual manner, preferably with hydrogen in the presence of a catalyst, such as a platinum, palladium or nickel catalyst. A Schiff's base can also be reduced by means of a di-light metal hydride such as for example an alkali metal-earth metal hydride, such as sodium borohydride or lithium-aluminum hydride. If one starts from starting substances which contain acyloxy groups, then these are, for example when using lithium-aluminum hydride, simultaneously split to give the free hydroxyl groups.

Substituents can be introduced, modified or split off in resulting compounds, to suit the definition of the final substances.

Thus for example substituents, for example those mentioned above, can be introduced into resulting N-unsubstituted or N-monosubstituted aminoalkyl groups. The introduction takes place in the usual manner, for example by reaction with a reactive ester of a corresponding alcohol. A reactive ester is above all an ester with hydrochloric, hydrobromic or hydriodic acid, sulfuric acid or an arylsulfonic acid, for example p-toluenesulfonic acid. The substituents can also be introduced reductively, for example by reaction with a corresponding aldehyde or ketone under reducing conditions, that is to say in the presence of catalytically activated hydrogen or formic acid.

In resulting compounds which possess an α-aralkyl radical, such as a benzyl radical, at the aminoalkyl nitrogen atom, this radical can be split off by reduction. The reduction takes place in the usual manner, for example as described above for the α-aralkoxy radical.

In resulting compounds which possess an acyloxy radical in one or more of positions 1 to 8, the latter can be converted into a free hydroxyl group. This conversion takes place in the usual manner, for example by hydrolysis, for example in the presence of acid reagents such as for example dilute inorganic acids, such as sulfuric acid or hydrohalic acids, or preferably in the presence of basic reagents, for example alkali hydroxides, such as sodium hydroxide. The conversion of an acyloxy group into a free hydroxyl group can also be effected by reduction, for example by treatment with a complex metal hydride such as lithium-aluminum hydride.

In resulting compounds possessing free hydroxyl groups in one or more of positions 1–8, these hydroxyl groups can be acylated. The acylation takes place in the usual manner, above all by reaction with a halide, such as the chloride, or an anhydride of an appropriate acid.

The invention also relates to those embodiments of the process in which one starts from a compound obtainable as an intermediate product at any stage and carries out the missing stages, or in which a starting substance is formed under the reaction conditions or is optionally used in the form of a salt and/or racemate or optical antipode.

The reactions mentioned are carried out in the usual manner in the presence or absence of diluents, condensation agents and/or catalysts at lowered, ordinary or elevated temperature, optionally in a closed vessel.

Depending on the process conditions and starting substances, the final substances are obtained in the free form or in the form of their acid addition salts, which are also included in the invention. Thus for example basic, neutral or mixed salts, and optionally also hemihydrates, monohydrates, sesquihydrates or polyhydrates thereof, can be obtained. The acid addition salts of the new compounds can be converted to the free compound in a manner which is in itself known, for example by means of basic reagents, such as alkalis or ion exchangers. On the other hand, the resulting free bases can form salts with organic or inorganic acids. To manufacture acid addition salts, such acids are in particular used as are suitable for the formation of therapeutically acceptable salts. As such acids there may for example be mentioned: hydrohalic acids, sulfuric acids, phosphoric acids, nitric acid, perchloric acid, aliphatic, alicyclic, aromatic or heterocyclic carboxylic or sulfonic acids, such as formic, acetic, propionic, succinic, glycollic, lactic, malic, tartaric, citric, ascorbic, maleic, hydroxymaleic or pyruvic acid; phenylacetic, benzoic, p-aminobenzoic, anthranilic, p-hydroxybenzoic, salicylic or p-aminosalicylic acid; embonic acid, methanesulfonic, ethanesulfonic, hydroxyethanesulfonic or ethylenesulfonic acid; halogenobenzenesulfonic, toluenesulfonic, naphthalenesulfonic acid or sulfanilic acid; methionine, tryptophan, lysine or arginine.

These or other salts of the new compounds such as for example the picrates, can also serve for the purification of the resulting free bases, by converting the free bases into salts, separating these off and again liberating the bases from the salts. Because of the close relationship between the new compounds in the free form and in the form of their salts the free compounds are, in the preceding and following texts, also to be understood as the corresponding salts, providing such is possible or appropriate under the circumstances.

Depending on the choice of the starting substances and procedures, the new compounds can be in the form of racemates or optical antipodes to the extent that they possess at least one asymmetric carbon atom.

Resulting racemates can be resolved according to known methods, for example by recrystallization from an optically active solvent, by means of micro-organisms, or by reaction with an optically active acid which forms salts with the racemic compound and resolution of the salts obtained in this manner into the diastereomers, for example on the basis of their differing solubilities, and the antipodes can be liberated from the diasteresomers by the action of suitable reagents. Particularly usual optically active acids are for example the D- and L-forms of tartaric acid, di-o-toluyltartaric acid, malic acid, mandelic acid, camphorsulfonic acid or quinic acid. Advantageously, the more active of the two antipodes is isolated.

Appropriately, such starting substances are used for carrying out the reactions according to the invention as lead to the initially particularly emphasized final substances.

The starting substances are known or can, if they are new, be obtained according to methods which are in themselves known. New starting substances also form the subject of the invention.

The new compounds can for example be employed in the form of pharmaceutical preparations in which they are present in the free form or optionally in the form of their salts, especially of the therapeutically acceptable salts, mixed with a pharmaceutical organic or inorganic, solid or liquid excipient which is for example suitable for enteral or parenteral administration. Suitable substances for forming the latter are substances which do not react with the new compounds, such as for example water, gelatine, lactose, starch, stearyl alcohol, magnesium stearate, talc, vegetable oils, benzyl alcohols, gum, propylene glycols, white petroleum jelly or other known medicinal excipients. The pharmaceutical preparations can for example be in the form of tablets, dragées, capsules, suppositories or in a liquid form as solutions (for example as an elixir or syrup), suspensions or emulsions. They are optionally sterilized and/or contain auxiliary substances such as preservatives, stabilizers, wetting agents or emulsifiers, solubilizing agents or salts for regulating the osmotic pressure or buffers. They can also contain other therapeutically valuable substances. The pharmaceutical preparations are formulated according to usual methods. The dosage of the new compounds can vary depending on the compound and on the individual requirements of the patient. It is normally, for example when administered orally, 25–200 mg. daily, particularly between 75 and 300 mg. The daily dose can be subdivided and can in this way be administered two or three times daily.

The new compounds can also be used in the form of feedstuffs or of additives for animal fodder. For this the usual extenders and diluents and/or feedstuffs are for example employed.

The invention is described in more detail in the following examples.

EXAMPLE 1

0.5 g. of sodium nitrite in 1.5 ml. of water are added dropwise whilst stirring, at 10° C., to a solution of 2 g. of 2-amino-9-(dimethylaminomethyl)-9,10-dihydro-9,10-ethanoanthracene in 10 ml. of 2 N sulfuric acid. After 2 hours 3 ml. of concentrated sulfuric acid are added and the mixture is warmed to 80° C. for 2 hours. Thereafter the solution is cooled and rendered alkaline by adding 2 N sodium hydroxide solution. The mixture is extracted with methylene chloride and the aqueous solution is separated off. The aqueous solution is acidified by adding hydrochloric acid and is subsequently rendered slightly alkaline with sodium bicarbonate. The mixture is extracted with methylene chloride. After drying and evaporating the solvent 2-hydroxy-9-(dimethylaminomethyl)-9,10-dihydro-9,10-ethano-anthracene of formula

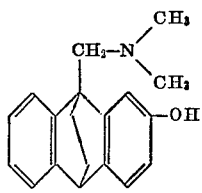

is left; this can be converted to the corresponding 2-methoxy compound of melting point 98–100° C. by reaction with diazomethane.

The 2-amino-9-(dimethylaminomethyl)-9,10-dihydro-9,10-ethano-anthracene used as the starting material can be manufactured as follows:

A mixture of 9.7 g. of concentrated nitric acid in 50 ml. of acetic anhydride is added dropwise, whilst stirring, to a suspension of 23 g. of 9,10-dihydro-9,10-ethano-9-anthracenealdehyde in 100 ml. of acetic anhydride. After 6 hours 200 ml. of water are added and the mixture is stirred for a further 6 hours at room temperature. The viscous oil which has separated out is separated off and mixed with ether. 2-nitro-9,10-dihydro-9,10-ethano-9-anthracenealdehyde deposits in crystals. Melting point 170–175° C.

50 ml. of a 25% strength solution of methylamine in ethanol are added to 10 g. of 2-nitro-9,10-dihydro-9,10-ethano-9-anthracenealdehyde and the mixture is warmed to 90° C. for 4 hours in an autoclave. On cooling 2-nitro-9-(methyliminomethyl)-9,10-dihydro-9,10 - ethano-anthracene crystallizes out. The compound melts at 154–155° C.

2 g. of sodium borohydride are added to a suspension of 2 g. of 2-nitro-9-(methyliminomethyl)-9,10-dihydro-9,10-ethano-anthracene in 50 ml. of methanol at room temperature and the mixture is stirred for 4 hours. Thereafter 200 ml. of water are added dropwise. 2-nitro-9-(methylaminomethyl)-9,10-dihydro-9,10-ethane - anthracene precipitates; this substance melts at 131–133° C. after sublimation.

The hydrochloride of the compound melts at 281–283° C. and the methanesulfonate at 250–252° C.

16 g. of 2-nitro-9-(methylaminomethyl)-9,10-dihydro-9,10-ethano-anthracene are warmed for 2 hours to 90° C. with 5 ml. of 40% strength formaldehyde solution in 32 ml. of formic acid. Thereafter the mixture is cooled with ice and rendered alkaline by adding 5 N sodium hydroxide solution. The base which has separated out is extracted with methylene chloride. After drying and evaporating the solvent 2-nitro-9-(dimethylaminomethyl)-9,10-dihydro-9,10 - ethano - anthracene is left, melting at 149–151° C. after recrystallization from alcohol.

14 g. of 2-nitro-9-(dimethylaminomethyl)-9,10-dihydro-9,10-ethano-anthracene in 150 ml. of dimethylformamide are hydrogenated at room temperature after adding 3 g. of Raney nickel. After the hydrogen uptake has ended, the catalyst is filtered off and the solvent is evaporated. 2-amino - 9 - (dimethylaminomethyl)-9,10-dihydro-9,10-ethano-anthracene is left; the maleate of this compound melts at 192–193° C.

EXAMPLE 2

9.0 g. of 2-benzyloxy-9-(methylaminomethyl)-9,10-dihydro-9,10-ethano-anthracene are dissolved in 100 ml. of ethanol and after the addition of 1 g. of palladium carbon (10%) hydrogenated at room temperature. After the absorption of hydrogen has ceased, the catalyst is filtered off and the filtrate evaporated in vacuo. The radical is dissolved in 2 N sodium hydroxide solution and the undissolved constituents are filtered off. The filtrate is acidified by the addition of 2 N hydrochloric acid and filtered again. On adding sodium hydrogen carbonate to the acid filtrate, 2-hydroxy-9-(methylaminomethyl)-9,10-dihydro-9,10-ethano-anthracene of the formula

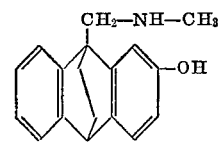

precipitates which, after recrystallization from isopropanol, melts at 120–125° C. The hydrochloride melts at 261–262° C.

The 2-benzyloxy-9-(methylaminomethyl)-9,10-dihydro-9,10-ethano-anthracene used as starting material may be prepared as follows:

29 ml. of nitric acid of 65% strength are added dropwise to 103 ml. of acetic anhydride at 30–35° C. The resulting solution is added slowly to a suspension of 90 g. of 9-cyano-9,10-dihydro-9,10-ethano-anthracene and the whole is stirred for 12 hours at room temperature. The precipitate is then filtered and washed with methanol. 2-nitro-9-cyano-9,10-dihydro-9,10 - ethano - anthracene melting at 215° C. is obtained.

16 g. of Raney nickel are added to a solution of 156 g. of 2-nitro - 9 - cyano-9,10-dihydro-9,10-ethano-anthracene in 1500 ml. of dimethylformamide and the whole is hydrogenated at 40° C. After 40 liters of hydrogen have been taken up, the catalyst is filtered off and the solvent evaporated in vacuo. 80 ml. of isopropanol and 80 ml. of petroleum ether are added to the residue, whereupon 2 - amino-9-cyano-9,10-dihydro-9,10-ethano-anthracene crystallizes out. The compound melts at 133–137° C. after recrystallization from a mixture of methanol and water.

100 g. of this amine are added to 875 mg. of N-hydrochloric acid, and then a solution of 28 g. of sodium nitrite in 55 ml. of water is added dropwise with stirring at room temperature. After the reaction mixture has been stirred for one hour at room temperature, the diazonium solution is filtered and treated with 42 ml. of concentrated sulfuric acid. The reaction mixture is stirred for another hour at 95° C. and then extracted with ether after being cooled to room temperature. The ether is extracted with 2 N sodium hydroxide solution and the alkaline extract is separated. On acidifying the alkaline extract with concentrated sodium hydroxide solution, 2-hydroxy-9-cyano - 9,10 - dihydro-9,10-ethano-anthracene separates which is then extracted with ether and, after the solvent has been evaporated, remains behind as a pale yellow, viscous oil.

46 g. of this oil are added to a solution of sodium ethylate in ethanol (prepared by dissolving 4.6 g. of sodium in 400 ml. of ethanol), and 36 g. of benzyl bromide are then added dropwise, and the whole is stirred for 4 hours at room temperature. The precipitated sodium bromide is filtered off, and the filtrate is evaporated in vacuo. 2-benzyloxy-9-cyano-9,10-dihydro-9,10-ethano-anthracene remains, which melts at 98–100° C. after purification by chromatography and recrystallization from ethanol.

To hydrolyse the nitrile, 91 g. of 2-benzyloxy-9-cyano-9,10 - dihydro - 9,10 - ethano-anthracene are heated with 25 g. of potassium hydroxide in 450 ml. of ethyleneglycol for 20 hours at 190° C. 1000 ml. of water are then added and the undissolved constituents are filtered off. The filtrate is acidified by the addition of concentrated hydrochloric acid, 2 - benzyloxy - 9,10 - dihydro - 9,10-ethano - 9 - anthracene carboxylic acid precipitating and melting at 195–199° C.

For conversion into the acid chloride 60 g. of 2-benzyloxy - 9,10 - dihydro - 9,10 - ethano - 9 - anthracene carboxylic acid are heated with 90 ml. of oxalyl chloride under reflux for 90 minutes. The excess oxalyl chloride is then evaporated and the crude acid chloride remains, which is then employed directly.

60 g. of the crude acid chloride are dissolved in 300 ml. of methylene chloride and monomethylamine is introduced at room temperature. After 2 hours, 200 ml. of 2 N sodium hydroxide solution are added, and the methylene chloride layer separated, washed with water and evaporated. 2 - benzyloxy - 9,10 - dihydro - 9,10-ethano - 9 - anthracene carboxylic acid methylamide remains which after recrystallization from isopropanol melts at 170–172° C.

12 g. of this amide are dissolved in 100 ml. of tetrahydrofuran, added dropwise to 12 g. of lithium aluminum hydride in 100 ml. of tetrahydrofuran and heated for 9 hours at 60° C. The reaction mixture is then cooled, and in succession there are added 15 ml. of water, 15 ml. of sodium hydroxide solution of 15% strength and 45 ml. of water. The precipitate is filtered off and the filtrate evaporated. 2 - benzyloxy - 9 - (methylaminomethyl)-9,10 - dihydro - 9,10 - ethano-anthracene remains, whose hydrochloride melts at 210–213° C.

EXAMPLE 3

In an analogous manner to the described in Example 2 there may be obtained from the corresponding 2-benzyloxy compound or the corresponding 2-benzyloxycarbonyloxy compound, 2 - hydroxy - 9 - (γ-methylaminopropyl) - 9,10 - dihydro - 9,10 - ethano-anthracene, 2 - hydroxy - 9 - (γ-dimethylaminopropyl) - 9,10-dihydro - 9,10 - ethano-anthracene or their salts, for example hydrochlorides.

EXAMPLE 4

Tablets containing 25 mg. of active substance are manufactured in the usual manner, for example with the following composition:

|  | Mg. |
|---|---|
| 2 - hydroxy - 9 - (dimethylaminomethyl)-9,10-dihydro - 9,10 - ethano-anthracene hydrochloride | 25 |
| Lactose | 35 |
| Wheat starch | 44.4 |
| Colloidal silica | 6 |
| Magnesium stearate | 0.6 |
| Talc | 9 |
|  | 120.0 |

In an analogous manner tablets containing 25 mg. of 2 - hydroxy - 9 - (methylaminomethyl) - 9,10-dihydro-9,10-ethano-anthracene hydrochloride can be obtained.

EXAMPLE 5

In a manner analogous to that described in Example 2, the following compounds and their salts, such as hydrochlorides, may be prepared:

(a) 3-hydroxy-9-(morpholinomethyl)-9,10-dihydro-9,10-ethanoanthracene;
(b) 4-hydroxy-9-(γ-pyrrolidinopropyl)-9,10-dihydro-9,10-ethanoanthracene;
(c) 2-hydroxy-9-[(2,6-dimethyl-thiomorpholino)-methyl]-9,10-dihydro-9,10-ethanoanthracene;
(d) 2-hydroxy-9-(γ-piperidinopropyl)-9,10-dihydro-9,10-ethanoanthracene;
(e) 2-hydroxy-9-(N'-methylpiperazinomethyl)-9,10-dihydro-9,10-ethanoanthracene;
(f) 1,3,6-trihydroxy-9-(dimethylaminomethyl)-9,10-dihydro-9,10-ethanoanthracene.

What is claimed is:
1. A member selected from the group consisting of compounds of the formula

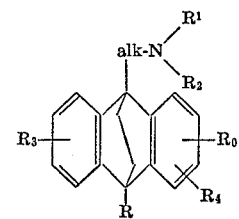

in which alk stands for lower alkylene, $R_0$ for hydroxy, $R_3$ and $R_4$ each stands for hydrogen, R stands for hydrogen and $R_1$ and $R_2$ each stands for a member selected from the group consisting of hydrogen and lower alkyl, and their therapeutically acceptable acid addition salts.

2. A product as claimed in claim 1, in which $R_0$ stands for hydroxy, alk stands for a member selected from the group consisting of methylene and 1,3-propylene, $R_1$ for a member selected from the group consisting of hydrogen and lower alkyl, $R_2$ for lower alkyl and R, $R_3$ and $R_4$ each stands for hydrogen.

3. A product as claimed in claim 1, in which $R_0$ stands for hydroxy in 2-position, alk stands for a member selected from the group consisting of methylene and 1,3-propylene, $R_1$ stands for a member selected from the group consisting of methyl and ethyl, $R_2$ for a member selected from the group consisting of hydrogen, methyl and ethyl and R, R₃ and R₄ each stands for hydrogen.

4. A compound as claimed in claim 1 which compound is the 2-hydroxy-9-(dimethylaminomethyl)-9,10-dihydro-9,10-ethano-anthracene or a therapeutically acceptable acid addition salt thereof.

5. A compound as claimed in claim 1 which compound is the 2-hydroxy-9-(methylaminomethyl)-9,10-dihydro-9,10-ethano-anthracene or a therapeutically acceptable acid addition salt thereof.

6. A compound as claimed in claim 1 which compound is the 2-hydroxy-9-(γ-dimethylaminopropyl)-9,10-dihydro-9,10-ethano-anthracene or a therapeutically acceptable acid addition salt thereof.

7. A compound as claimed in claim 1 which compound is the 2-hydroxy-9-(γ-methylaminopropyl)-9,10-dihydro-9,10-ethano-anthracene or a therapeutically acceptable acid addition salt thereof.

8. A compound as claimed in claim 3 in the form of one of its optical antipodes.

9. The compound claimed in claim 5 in the form of one of its optical antipodes.

References Cited

UNITED STATES PATENTS

| 3,399,201 | 8/1968 | Schmidt et al. | 260—570.9 X |
| 3,337,623 | 8/1967 | Engelhardt et al. | 260—570.8 X |

FOREIGN PATENTS

| 1,332,530 | 6/1963 | France | 260—570.8 |

OTHER REFERENCES

Protiva et al., "Jour. of Med. and Pharm. Chem.," vol. 1, No. 2, pp. 411–15 (1961).

ROBERT V. HINES, Primary Examiner

U.S. Cl. X.R.

260—141, 243 (B), 247.2 (B), 247.7 (AVE), 268 (TR), 294.3, 294.7, 326.3, 326.5 (C), 343.7, 463, 465 (R)(E) (F), 477, 488 (CD), 490, 501.12, 501.18, 501.19, 520, 544 (M), 559 (R), 566 (R)(F), 567.5, 570.8 (T.C.), 570.9, 590, 599; 424—246, 248, 250, 267, 274, 280, 330